(12) United States Patent
Opaluch et al.

(10) Patent No.: US 7,698,218 B1
(45) Date of Patent: Apr. 13, 2010

(54) METHOD AND SYSTEM FOR FLEXIBLE GROUP ORDERING AND BILLING

(75) Inventors: Robert Edward Opaluch, Waltham, MA (US); Cynthia DuVal, Northborough, MA (US)

(73) Assignee: Verizon Laboratories Inc., Waltham, MA (US)

( * ) Notice: Subject to any disclaimer, the term of this patent is extended or adjusted under 35 U.S.C. 154(b) by 1464 days.

(21) Appl. No.: 10/290,801

(22) Filed: Nov. 8, 2002

(51) Int. Cl.
  *G06Q 40/00* (2006.01)
  *H04M 15/00* (2006.01)

(52) U.S. Cl. .................................. 705/40; 379/114.22
(58) Field of Classification Search .................. 705/26, 705/34, 35, 37, 40; 379/114.22
  See application file for complete search history.

(56) References Cited

U.S. PATENT DOCUMENTS

| | | | | |
|---|---|---|---|---|
| 5,381,467 A | * | 1/1995 | Rosinski et al. | 379/121.01 |
| 5,440,620 A | * | 8/1995 | Slusky | 379/100.07 |
| 5,771,282 A | * | 6/1998 | Friedes | 379/121.03 |
| 5,805,680 A | * | 9/1998 | Penzias | 379/118 |
| 5,832,460 A | * | 11/1998 | Bednar et al. | 705/27 |
| 5,915,006 A | * | 6/1999 | Jagadish et al. | 379/115.01 |
| 6,035,281 A | * | 3/2000 | Crosskey et al. | 705/14 |
| 6,044,362 A | * | 3/2000 | Neely | 705/34 |
| 6,173,046 B1 | * | 1/2001 | Jagadish et al. | 379/111 |
| 6,195,419 B1 | * | 2/2001 | Gilboy | 379/114.26 |
| 6,282,274 B1 | * | 8/2001 | Jain et al. | 379/114.26 |
| 6,757,371 B2 | * | 6/2004 | Kim et al. | 379/114.22 |
| 6,956,935 B2 | * | 10/2005 | Brown et al. | 379/114.21 |
| 7,046,988 B2 | * | 5/2006 | Kotzin | 455/406 |
| 7,269,251 B1 | * | 9/2007 | Jokinen | 379/114.2 |
| 2003/0120571 A1 | * | 6/2003 | Blagg | 705/35 |
| 2004/0081302 A1 | * | 4/2004 | Kim et al. | 379/114.22 |

OTHER PUBLICATIONS

Howe, Verizon Communications Adds Online Service in N.E.; Boston Globe. Boston, Mass.: Sep. 30, 2000.*

* cited by examiner

*Primary Examiner*—Jagdish N. Patel
*Assistant Examiner*—Kenneth L Bartley

(57) ABSTRACT

A method for flexible billing provides for a service provider to apportion billing for one or more services among a number of parties. The services may be shared among the parties and the bill may be apportioned in accordance with an apportioning scheme, or billing breakout as determined by the parties. The parties may designate a coordinator to administer the service and serve as the contact point between the parties and the service provider. The flexible billing can also provide for one party to pay a portion of the service charges for one or more other parties. Incentives in the form of reduced charges may be provided by the service provider.

15 Claims, 2 Drawing Sheets

METHOD AND SYSTEM FOR FLEXIBLE GROUP ORDERING AND BILLING

RELATED APPLICATIONS

There are no related applications.

FIELD OF THE INVENTION

The methods and systems relate to billing methods and systems, and more particularly to apportioning charges for services.

BACKGROUND INFORMATION

Current billing practices that may be used by service providers can bill one customer for one or more services on one billing statement. The services may be separately listed on the statement, with a single total shown for a balance due. For example, two phone services may be billed to one customer, or an Internet service and a cable service may be billed together. The statement may also reflect charges for services provided to a third party, which the customer has agreed to be responsible for.

The customer may be a business having a substantial number of service users and the billing statement may include a listing of charges per user. However, the customer, or business in this case, can be responsible for payment to the service provider for the total user charges and the users may be separately responsible to the business for their individual charges. For example, each employee of a business may have a phone having a separate extension. The billing statement from the service provider may reflect charges and totals for each extension, with a total of charges for all extensions due from the business. The business may in turn provide the employees with the charges for their extensions, such that the employees may reimburse the business for personal usage.

Currently, individuals or groups who wish to share one or more services may not be able to be billed individually for their respective shares of the services. For example, roommates may agree to share Internet service, with the charges split 60/40 based on their anticipated usage. However, the billing statement may reflect one charge and the room mates may need to divide the charge for each billing statement to determine their respective shares. In another example, parents may wish to pay for basic Internet service for their children living away from home, so that they may more easily communicate by email. The basic charge may vary, the children may wish to have different levels of service and some may incur additional charges for promotions or offers from the service provider. With current billing practices, either the parents can be billed for the children's services and can obtain reimbursement from their children for the extra charges, or the children can be billed individually and obtain reimbursement from the parents for the basic charge.

Currently, some service providers may provide cell phone services wherein the costs of additional phones and lines may be discounted for a group of users, e.g., a family as in a "Family Plan". Typically, minutes of usage may be shared by members of the group across the lines that make up the group service. However, such group plans can provide only a single bill to one member of the group and do not provide separate billing for each member of the group.

SUMMARY OF THE INVENTION

A method for billing a service may comprise obtaining billing information from at least one customer of a group of customers, apportioning charges for the service to the customers of the group based on the billing information and separately billing the apportioned charges to individual members of the group. The method may comprise maintaining contact between the provider of the service and the group through a coordinator that may be designated by the group. Billing information may be uploaded to the service provider by completing a billing template provided by the service provider on a web site. Approval of the billing information may be obtained from individual members of the group.

In one embodiment, a method of apportioning billing for a service among members of a group by a service provider can include receiving a contact from one or more members of the group, providing a billing template in response to the contact, receiving the completed billing template from the one or more members, approving the completed template, verifying the billing information on the completed template with other members of the group, initiating the service, apportioning the charges for the service in accordance with the billing information provided and separately billing the individual members of the group. The billing template can provide for the designation of a group coordinator who can serve as the service provider's point of contact with the group. If the billing template is modified after initiating service, approval and verification of the modified billing information is repeated.

In one embodiment, a computer-readable medium may contain instructions for controlling a computer system to implement the method. In one embodiment, a system for apportioning billing for a service among members of a group may comprise a network connection between the group and a provider of the service, a memory for storing billing information obtained from the group and a processor for apportioning billing based on the billing information and service usage. The network connection can be provided by a server, such as an Internet server, and a billing template can be displayed to one or more group members for uploading the billing information to the service provider.

BRIEF DESCRIPTION OF THE DRAWINGS

The following figures may depict certain illustrative embodiments. The depicted embodiments can be understood as illustrative and not as limiting in any way.

DETAILED DESCRIPTION

Figure 1:
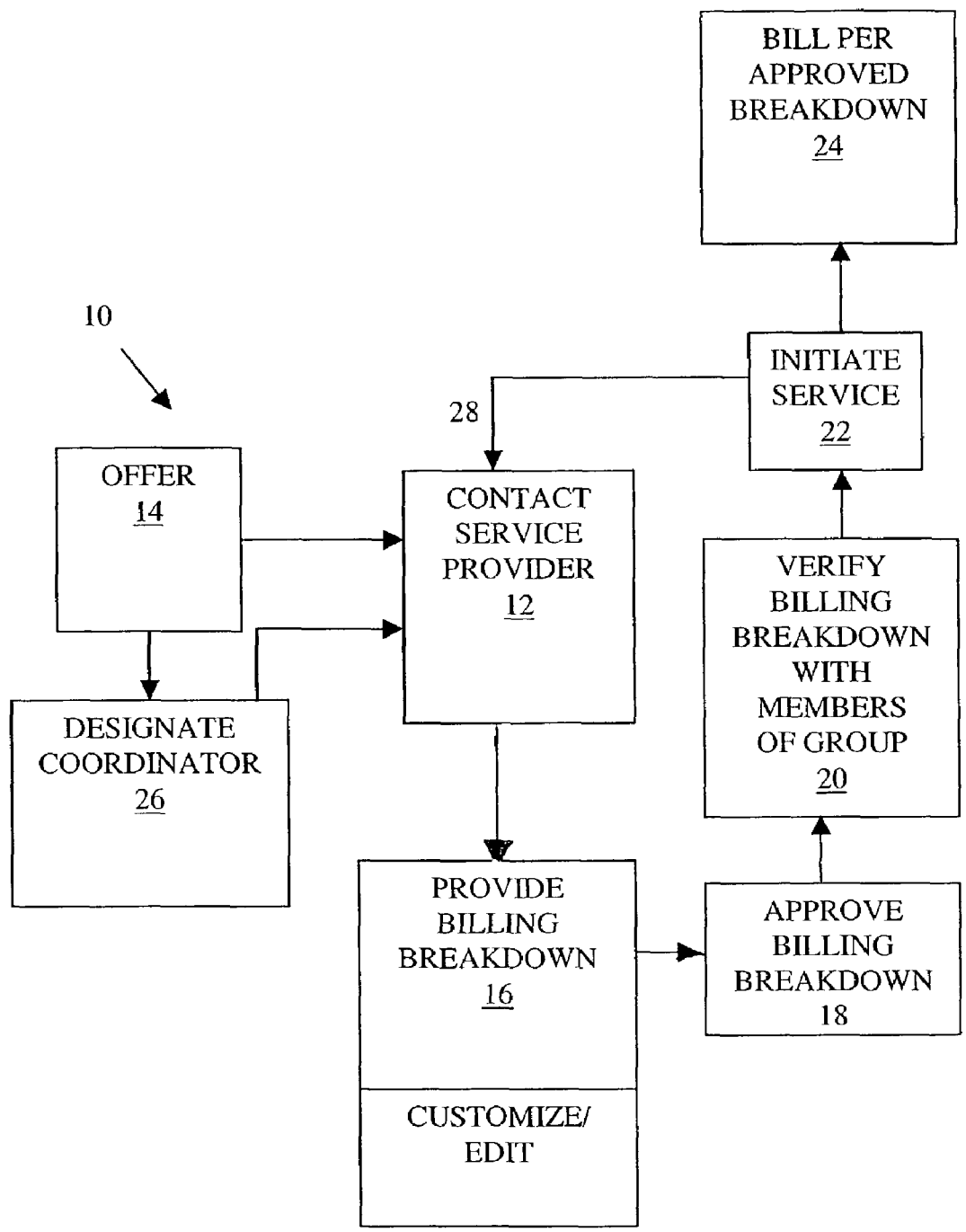
FIG. 1 shows an illustrative flow chart for ordering services and apportioning charges for the services.

Referring now to FIG. 1, there can be shown a service ordering and billing method 10 that may provide increased flexibility for service provider customers and may increase efficiency for service providers. One or more customers may first contact a service provider to obtain a service, as may be shown at 12. The contact may be made by phone, through a service provider web site, by personal contact or by/through other means as established by the service provider. The contact may be as a result of service provider advertising, promotions and/or other offerings for group ordering and billing packages, as may be shown at 14. The service may be a single service that can be shared among users, or may be individual services for each user, or may be a combination of shared and individual services.

Once the contact is established, a breakdown of the desired billing may be given to the service provider 16. The breakdown may indicate to the service provider the way in which charges for the service may be apportioned among the users of the service and may also provide billing information for users billed by the service provider. The breakdown may be taken from a billing template that the service provider may display to the user, as on a web site, or as provided in a bulk mailing that the service provider may use to promote the group ordering/billing plan or plans. The template may provide billing and ordering options that the group may edit and/or customize to suit the needs of the group. In one embodiment, the service provider may consider billing options not originally contemplated by the template. The group may indicate the desired features and may negotiate with the service provider to obtain the features at some agreed upon cost.

To continue the example of the roommates previously described, the breakdown may indicate the desired 60/40 split of charges between the roommates. For the example of the parents and children previously described, the breakdown may include a fixed monthly charge billed to the parents and usage charges to the children. Other examples may include certain products or services being paid by one party and other products or services apportioned among other parties, or one or more parties may agree to pay up to a certain amount, with a cap for total charges over a certain period of time. It can be understood that the breakdown may be combinations of percentages, fixed monthly charges, or other apportionment schemes as may be provided by the service provider and may not be limited by the examples described herein.

Once the billing breakdown is agreed to by the group and the service provider, as at 18, the service provider may obtain approval from the customers to which the charges for the service will be apportioned, as may be indicated at 20. When possible, approvals may be obtained at the time of contact. The approval may be obtained by means as may be available to the service provider, for example, but not limited to, phone contacts, emails, faxes, online registration, or the like. Once approvals have been obtained, the service provider may initiate the service, as shown at 22 and may bill for the service (24) as provided for in the approved breakdown.

When the service may be apportioned among a group of users, a group coordinator may be designated, as indicated at 26. The group coordinator may be the point of contact between the service provider and the group and may be given responsibilities as determined by the group. For example, the group can decide that the coordinator's responsibilities may include, but may not necessarily be limited to, service ordering, coordination of service maintenance and other such administrative duties. In one embodiment, the service provider may suggest that the group designate the coordinator and may provide for the designation of the group coordinator as part of the service ordering process. In other embodiments, the group may informally designate the group coordinator amongst themselves. When a coordinator designation may be made, the approvals obtained by the service provider at 20 may so indicate the designation and the responsibilities of the coordinator. It can be understood that the coordinator may be one of the group of users, may be two or more of the group of users acting in concert, or may be other than a member of the group.

In the embodiment illustrated in FIG. 1, the coordinator may be designated prior to contacting the service provider at 12. However, it can be understood that the method 10 may provide for the coordinator to be designated at other times, or method 10 may not require a coordinator to be designated at any time, or a coordinator may be designated by the service provider, in concert with, or as approved by the group. When no coordinator may be designated, the members of the group may be responsible for their own individual services. Any changes to their individual services that may impact services or charges to other group members may require the service provider to obtain approvals from the other group members. The group may contact the service provider after service has been initiated, as may be indicated by arrow 28, so as to make changes, edits, or otherwise customize the service. For example, changes in the members of the group, the amounts or percentages charged to the members, the designation of the coordinator, or other such changes may be made.

It can be seen from the above that the designation of a coordinator may be advantageous to both the group and the service provider. The members may not need to concern themselves with the administrative aspects of the service. By designating a coordinator who may have some technological knowledge, questions concerning operational problems, software installation, etc. may be directed to the coordinator who may answer such questions directly or may interface with the service provider with a greater level of understanding. The service provider may gain efficiencies in dealing with a single point of contact, rather than receiving individual questions from members of the group. Also, changes in services, charges, or apportionments may be more easily implemented when a coordinator may have been designated with such responsibilities.

The group coordinator may also take more initiative than other group members in other areas that may affect the group's use of the services. For example, the group coordinator may suggest services, applications or products useful to members of the group, may educate group members about emerging services, applications and products, may create and edit orders for services, applications or products for members of the group and may review and edit orders by others in the group. The group coordinator may also assist others in the group to install new services, applications or equipment, maintain or administer services, applications or equipment and pay for services, applications or equipment. Further, the group coordinator may assist the service provider to sell, provision, maintain, administer or bill for services, applications or equipment, as by suggesting new services, applications or products that would help the group and/or suggesting new ordering and billing schemes that the group would like the provider to offer to this or other groups or individuals. The above may provide only some examples of the functions that a group coordinator may perform and the range of functions, actions and/or responsibilities of the group coordinator may not be limited by the examples given.

The savings in efficiency that a service provider may gain by the group's use of a group coordinator may be passed on to the group, e.g., in the form of lower charges by the service provider, as an incentive for the group to designate a coordinator. The coordinator may also receive an incentive to take on the responsibilities of a coordinator. Such incentives may also be in the form of lower charges by the service provider for the coordinator than for other members of the group, or the group may provide for a diminished apportionment for the coordinator. It can be understood that incentives may or may not be provided and that when provided, they take many forms and that the examples given herein may not limit the types of incentives that the service provider and/or group may provide, nor the means by which such incentives may be provided.

It can be seen that the motivation for a group coordinator may be intrinsic in whole or in part and need not be based on incentives. For example, the group coordinator may simply have a keen interest in new services, applications and products. Also, the group coordinator may benefit to a greater extent from many new services, applications and equipment whenever other members of the group also acquire and retain the same services, applications or equipment. For example, a member of the group may have a videophone service, application and/or other equipment that may offer little value unless others acquire the same capabilities. Such a member may agree to be a group coordinator if other group members obtain the same capabilities such that the group coordinator can take advantage of those capabilities.

The flexibility of the billing method 10 may also have advantages for both users and service providers. Users may realize greater benefits from a service if their social network (family, friends, business associates and the like) also has the service, as may be seen from the parents/children example described herein. Thus, users may be willing to incur some costs in order to have others in their social network subscribe. The method 10 described in relation to FIG. 1 can provide the means to do so. As an example, one member of a joint project, which may involve transfers of large files over the Internet, may be a knowledgeable user of a high speed Internet service, such as Direct Subscriber Line (DSL) service. Other members may have less expertise in using Internet services and thus may be reluctant to incur the additional costs for DSL service. The knowledgeable user may be willing to pay a portion of the other project members DSL costs in order to speed such file transfers and complete the project.

From a service provider standpoint, flexible billing may increase the demand for the services it provides, by making the services more affordable when services may be shared, or by encouraging users to try new services when a portion of their charges may be paid by another user. It can be appreciated that one who may have had the use of a service over a period of time may wish to continue the service even when a portion of the service is no longer paid by another user. Thus, the service provider may benefit by increasing the rate of adoption of the service.

Figure 2:
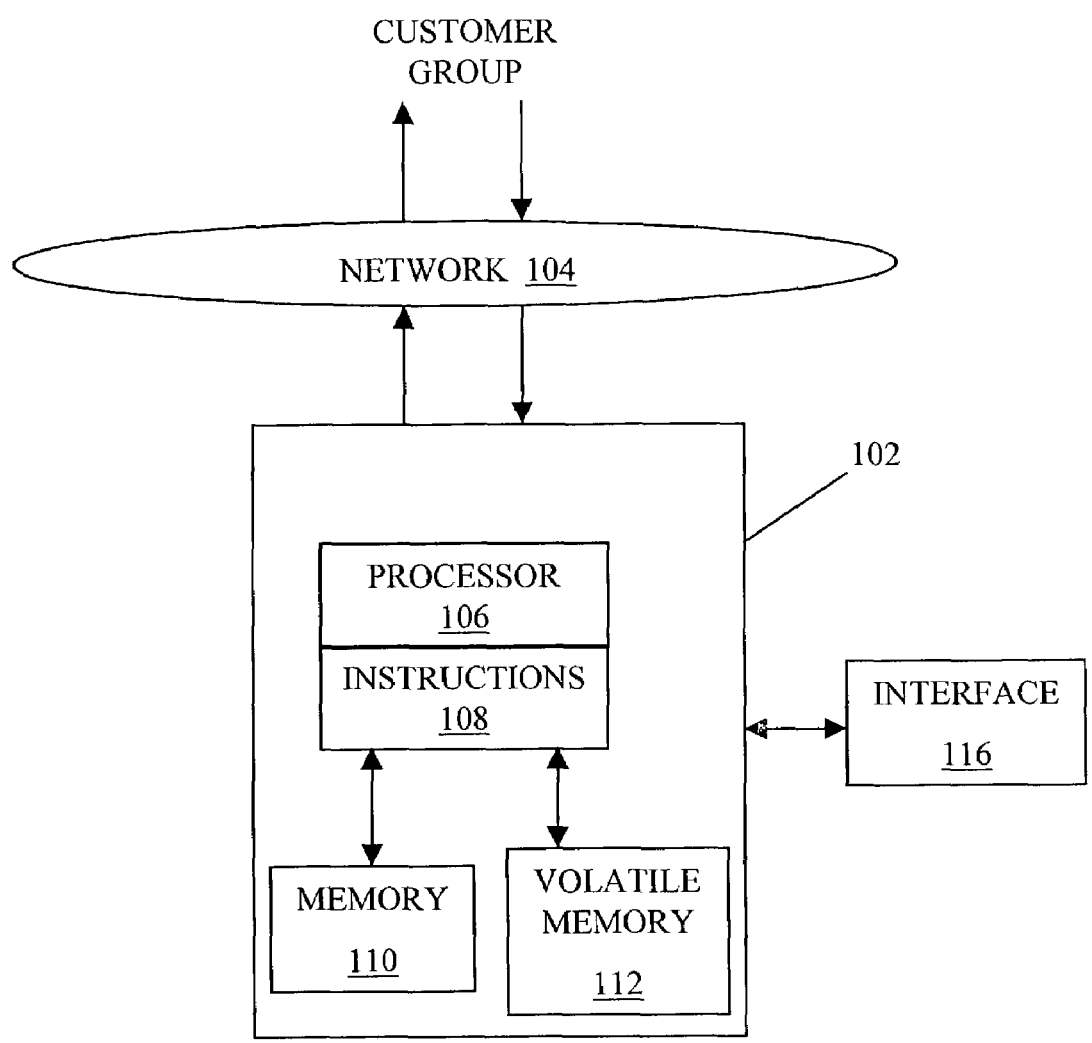
FIG. 2 shows a system that may implement the method of FIG. 1.

Referring now to FIG. 2, the method 10 of FIG. 1 may be implemented by a processor controlled device 102 operating on a network 104. The network 104 may be a phone network, cable network, Internet network, or other medium providing communications between the group and the service provider. FIG. 2 illustrates a processor 106 within device 102 suitable for executing instructions 108 implementing the method described above. The device 102 may include, in addition to processor 104, volatile memory 110 and non-volatile memory 112. The memory 110, 112 may store data corresponding to the billing information, apportionment scheme and service usage.

The memory 112 may also include instructions 108. The instructions 108 can be transferred, in the course of operation, from the non-volatile memory 112 to the volatile memory 110 and processor 106 for execution. The instructions 108 may control the processor 106 to prepare the billing based on the data stored in memory 110, 112. The device 102 may communicate with a user via a monitor or other input/output device such as a keyboard, mouse, microphone, and so forth, using interface 116.

The method 10, and systems for implementing same, may not be limited to particular software configurations or hardware, and may find applicability in many computing or processing environments. The methods and systems can be implemented in hardware or software, or a combination of hardware and software, or may be implemented by face-to-face communication or agreements. The methods and systems can be implemented in one or more computer programs executing on one or more programmable computers that include a processor, a storage medium readable by the processor (including volatile and non-volatile memory and/or storage elements), one or more input devices, and one or more output devices. In one embodiment, the methods and systems may be implemented on a computer in a network, or the computer may be a server in a network, such as an Internet server, or a server in a phone network. User control for the methods and systems may be provided through a user interface that may be incorporated with an Internet Service Provider user interface.

The computer programs may be preferably implemented using one or more high level procedural or object-oriented programming languages to communicate with a computer system; however, the program(s) can be implemented in assembly or machine language, if desired. The language can be compiled or interpreted.

The computer program(s) can be preferably stored on a storage medium or device (e.g., CD-ROM, hard disk, or magnetic disk) readable by a general or special purpose programmable computer for configuring and operating the computer when the storage medium or device is read by the computer to perform the procedures described herein. The system can also be considered to be implemented as a computer-readable storage medium, configured with a computer program, where the storage medium so configured causes a computer to operate in a specific and predefined manner.

While the methods and systems may have been disclosed in connection with a preferred embodiment shown and described in detail, various modifications and improvements thereon will become readily apparent to those skilled in the art. Those with ordinary skill in the art will recognize that the arrangement and connectivity of the flow diagram shown in FIG. 1 can be merely for illustrative purposes, and can be varied accordingly and components may be combined or otherwise reconfigured without departing from the scope of the disclosed methods and systems.

Accordingly, many additional changes in the details and arrangement of parts, herein described and illustrated, can be made by those skilled in the art. It will thus be understood that the following claims may not to be limited to the embodiments disclosed herein, can include practices otherwise than specifically described, and may be interpreted as broadly as allowed under the law.

What is claimed is:

1. A method comprising:
obtaining billing information by a processor controlled device from at least one customer of a group of customers prior to providing a service; the billing information including a billing template displayed on a web site completed by the at least one customer of the group of customers, the billing template providing a proposed breakdown from the at least one customer;
determining, by the processor controlled device, an apportionment scheme based at least in part on the proposed breakdown;
automatically apportioning charges for the service to the customers of the group based on the apportionment scheme for the individual members of the group of customers; and
separately billing the apportioned charges to individual members of the group of customers.

2. The method of claim 1, further comprising maintaining contact between a provider of the service and the group through a coordinator designated by the group.

3. The method of claim 1, wherein obtaining billing information comprises uploading billing information supplied through a web site.

4. The method of claim 1, where obtaining billing information comprises obtaining approval of the billing information from individual members of the group.

5. The method of claim 4, further comprising maintaining contact between a provider of the service and the group through a coordinator designated by the group.

6. The method of claim 5, wherein obtaining billing information comprises uploading billing information supplied through a web site.

7. A computer-readable medium containing instructions for controlling a computer system to bill for a service by a provider of the service by:
controlling the computer system to obtain billing information from at least one customer of a group of customers prior to providing the service; the billing information including a billing template completed by the at least one customer of the group of customers, the billing template providing a proposed breakdown from the at least one customer;
controlling the computer system to determine an apportionment scheme based at least in part on the proposed breakdown;
controlling the computer system to automatically apportion charges for the service to the customers of the group based on the apportionment scheme; and
controlling the computer system to separately bill the apportioned charges to individual members of the group of customers.

8. The computer readable medium of claim 7, further comprising instructions for controlling a computer system to bill for a service by controlling the computer to store information on a coordinator designated by the group and assigned responsibility by the group for contact between the group and the service provider.

9. The computer readable medium of claim 7, further comprising instructions for controlling a computer system to bill for a service by controlling the computer to upload billing information supplied through a web site.

10. The computer readable medium of claim 7, further comprising instructions for controlling a computer system to bill for a service by controlling the computer to obtain approval of the billing information from individual members of the group.

11. A method comprising:
receiving, in a processor controlled device, a contact from at least one member of a group;
providing a billing template including a proposed breakdown to the at least one member of the group in response to the contact;
receiving, in a processor controlled device, a completed billing template from the at least one member of the group, the completed template including billing information for the group and an apportionment scheme provided by the at least one member of the group;
approving the completed template;
verifying the billing information with each member of the group;
initiating a service for the members of the group after receiving the completed billing template, approving the completed template, and verifying the billing information;
automatically apportioning charges for the service to the members of the group based on the apportionment scheme by utilizing a processor controlled device; and
separately billing the apportioned charges to individual members of the group.

12. The method of claim 11, wherein the completed billing template includes the designation of a coordinator for the group, the service provider maintaining contact with the group through the coordinator.

13. The method of claim 11, further comprising repeating, approving and verifying when the billing template is modified by one or more members of the group after initiating the service.

14. A system comprising:
a network connection between at least one member of a group and a provider of a service;
a memory for storing group billing information and an apportionment scheme obtained from the at least one member of the group prior to providing the service; and
a processor for automatically apportioning billing based on the billing information, the apportionment scheme and service usage, wherein:
the network connection is an Internet connection; and
a billing template including a proposed breakdown is displayed to the at least one member of the group as a web page, the at least one member inputting the billing information and the apportionment scheme onto the billing template for uploading the billing information and the apportionment scheme to the provider of the service.

15. The system of claim 14, further comprising a network server providing the network connection.

* * * * *